United States Patent
Selep et al.

(10) Patent No.: US 9,491,185 B2
(45) Date of Patent: Nov. 8, 2016

(54) PROACTIVE CONTAINMENT OF NETWORK SECURITY ATTACKS

(71) Applicant: Hewlett-Packard Development Company, L.P., Houston, TX (US)

(72) Inventors: John Selep, Folsom, CA (US); Mauricio Sanchez, San Francisco, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 349 days.

(21) Appl. No.: 13/893,007

(22) Filed: May 13, 2013

(65) Prior Publication Data

US 2013/0269034 A1    Oct. 10, 2013

Related U.S. Application Data

(62) Division of application No. 10/942,207, filed on Sep. 15, 2004, now abandoned.

(51) Int. Cl.
*H04L 29/06* (2006.01)
*G06F 21/55* (2013.01)

(52) U.S. Cl.
CPC .......... *H04L 63/1408* (2013.01); *H04L 63/02* (2013.01); *H04L 63/145* (2013.01); *H04L 63/1416* (2013.01); *H04L 63/1441* (2013.01); *G06F 21/55* (2013.01)

(58) Field of Classification Search
CPC   H04L 63/1408;   H04L 63/1416;   G06F 21/55
See application file for complete search history.

(56) References Cited

U.S. PATENT DOCUMENTS

| | | | |
|---|---|---|---|
| 6,009,475 A | 12/1999 | Shrader | |
| 6,098,172 A * | 8/2000 | Coss | H04L 63/0254 726/11 |
| 6,154,775 A | 11/2000 | Coss et al. | |
| 6,243,815 B1 * | 6/2001 | Antur | H04L 41/0806 709/220 |
| 6,301,668 B1 * | 10/2001 | Gleichauf | H04L 12/2602 726/22 |
| 6,487,666 B1 * | 11/2002 | Shanklin | G06F 21/55 709/224 |
| 6,519,703 B1 | 2/2003 | Joyce | |
| 6,571,338 B1 | 5/2003 | Shalo et al. | |
| 6,571,738 B2 | 6/2003 | Rivard | |
| 6,578,151 B1 * | 6/2003 | Nilsen | H04L 63/0218 726/11 |
| 6,704,873 B1 * | 3/2004 | Underwood | H04L 63/02 709/223 |
| 6,772,347 B1 * | 8/2004 | Xie | H04L 29/06 709/242 |
| 6,789,203 B1 * | 9/2004 | Belissent | H04L 47/10 370/229 |
| 7,076,801 B2 * | 7/2006 | Gong | H04L 63/0281 726/11 |
| 7,143,438 B1 * | 11/2006 | Coss | H04L 29/06 709/224 |

(Continued)

OTHER PUBLICATIONS

Defeating DDOS Attacks; Cisco; White Paper; Jan. 9, 2004.*

(Continued)

*Primary Examiner* — James Turchen

(74) *Attorney, Agent, or Firm* — Hewlett Packard Enterprise Patent Department

(57) ABSTRACT

One embodiment disclosed relates to a method of proactive containment of network security attacks. Filtering parameters corresponding to a specific system vulnerability are determined. These parameters are distributed to network infrastructure components, and the network infrastructure components examine packets using these parameters to detect occurrence of an attack. Once an attack is detected, the network infrastructure components take action to inhibit the attack. Other embodiments are also disclosed.

23 Claims, 5 Drawing Sheets

(56) References Cited

U.S. PATENT DOCUMENTS

| | | | | |
|---|---|---|---|---|
| 7,152,105 | B2* | 12/2006 | McClure | H04L 41/12 340/5.53 |
| 7,269,847 | B2* | 9/2007 | Wesinger, Jr. | B65B 11/004 705/79 |
| 2002/0031134 | A1* | 3/2002 | Poletto | H04L 12/2602 370/401 |
| 2002/0133586 | A1* | 9/2002 | Shanklin | H04L 12/2602 709/224 |
| 2002/0188870 | A1* | 12/2002 | Gong | H04L 63/0281 726/4 |
| 2003/0033435 | A1* | 2/2003 | Hanner | H04L 69/04 709/247 |
| 2003/0084326 | A1* | 5/2003 | Tarquini | H04L 63/1408 726/23 |
| 2003/0097557 | A1* | 5/2003 | Tarquini | G06F 21/55 713/153 |
| 2003/0126468 | A1* | 7/2003 | Markham | H04L 63/0218 726/13 |
| 2003/0145225 | A1* | 7/2003 | Bruton, III | H04L 63/1408 726/23 |
| 2004/0218602 | A1* | 11/2004 | Hrastar | H04L 63/1416 370/390 |
| 2004/0250124 | A1* | 12/2004 | Chesla | G06F 21/552 726/13 |
| 2005/0027854 | A1* | 2/2005 | Boulanger | H04L 12/2602 709/224 |
| 2005/0044418 | A1* | 2/2005 | Miliefsky | H04L 63/1433 726/4 |
| 2005/0174961 | A1* | 8/2005 | Hrastar | H04W 28/20 370/328 |
| 2006/0015715 | A1* | 1/2006 | Anderson | H04L 63/1408 713/154 |
| 2006/0069912 | A1* | 3/2006 | Zheng | H04L 63/0823 713/151 |
| 2007/0214504 | A1* | 9/2007 | Milani Comparetti | H04L 63/1408 726/23 |

OTHER PUBLICATIONS

The Effect of Identifying Vulnerabilities and Patching Software on the Utility of Network Intrusion Detection; Richard Lippmann et al.; Oct. 2002; Recent Advances in Intrusion Detection, 5th International Symposium; RAID 2002.*

* cited by examiner

Typical Virus Attack Sequence
(Background Art)

Example Switch Configuration
300

PROACTIVE CONTAINMENT OF NETWORK SECURITY ATTACKS

CROSS REFERENCE TO RELATED APPLICATION

This application is a Divisional application of U.S. patent application Ser. No. 10/942,207, filed Sep. 15, 2004, titled "PROACTIVE CONTAINMENT OF NETWORK SECURITY ATTACKS", the disclosure of which is hereby incorporated by reference in its entirety.

BACKGROUND OF THE INVENTION

Field of the Invention

The present invention relates generally to computer networking and computer software.

Description of the Background Art

Personal computers and network clients are vulnerable to a broad variety of viruses and other security attacks. Individual systems succumbing to a virus attack can threaten other systems and overall network integrity, leading to lost user productivity and business. Many of these threats are present even when the client systems reside behind a network firewall, such as in an internal network within an organization. A typical sequence of events leading up to a virus attack is shown in FIG. 1A. The attack sequence begins with the discovery of a vulnerability (either in an operating system, utility, or application) (101), which may lead unscrupulous authors to create viruses that exploit that vulnerability (102). These viruses are then launched and spread among vulnerable systems (103). At that point, various commercial or public agencies begin to identify an attack and the specific virus responsible for the attack, but frequently the attack is already underway and damage or losses have already been incurred (104).

A traditional protection sequence 150 for providing anti-virus security is depicted in FIG. 1B. This traditional method 150 begins after a vulnerability has been discovered (101), viruses exploiting the vulnerability have been created (102) and launched (103), and a specific virus is discovered or identified (104). The specific virus is then analyzed (105) such that a virus signature is determined (106). These 'signatures' often rely on a physical disk or memory 'footprint' of the specific virus' object code. These virus 'signatures' are then distributed to populations of computer users (107), where users can then employ signature-based scanning of their systems (108) to detect the presence of the virus and allow removal. While somewhat effective, this traditional method leaves user organizations exposed to damage or loss between the point in time from when a vulnerability is discovered (101), and the point where all users have employed the signature-based scanning (108) to rid their systems of the threat. This interval is labeled in FIG. 1B as a 'vulnerability gap' (110). This traditional approach is also subject to variants of viruses that may exploit the same vulnerability but exhibit a different object code 'footprint' or signature and thereby escape detection until these variants are identified and their additional signature determined, the signatures distributed, and users utilize the new signatures in their scanning for viruses.

SUMMARY

One embodiment of the invention relates to a method of proactive containment of network security attacks. Filtering parameters corresponding to a specific system vulnerability are determined. These parameters are distributed to network infrastructure components, and the network infrastructure components examine packets using these parameters to detect occurrence of an attack. Once an attack is detected, the network infrastructure components take action to inhibit the attack.

Another embodiment relates to a system of proactive containment of network security attacks. The system includes software configured to determine network filtering parameters corresponding to a specific system vulnerability, and means for distributing said parameters to network infrastructure components. The network infrastructure components are configured to examine packets using said parameters to detect occurrence of an attack against the specific system vulnerability and are further configured to take action to inhibit the detected attack.

Another embodiment relates to a network infrastructure component configured for proactive containment of network security attacks. The network infrastructure component includes communication means for receiving network filtering parameters corresponding to a specific system vulnerability, and memory for storing said parameters. The network infrastructure component further includes circuitry and firmware configured to examine packets using said parameters to detect occurrence of an attack against the specific system vulnerability and to take action to inhibit the detected attack.

Other embodiments are also disclosed.

DETAILED DESCRIPTION

As described below, one embodiment of the invention relates to a method of proactive containment of network security attacks. This method relies on an identification of network 'behavior' associated with network security attacks, rather than a specific signature or disk footprint of a specific virus. Network filtering parameters corresponding to a specific system vulnerability or the behavior of a specific network security attack are determined. These parameters are distributed to network infrastructure components, and packets are filtered using these parameters to detect the occurrence of the attack. Once an attack is detected, the network infrastructure can take action to limit or eliminate the impact of the attack.

The traditional virus scanning technique described above can only detect previously-identified and analyzed virus signatures. Hence, a significant time lag may exist between the time that a system vulnerability is discovered and the point where traditional virus-scanning signatures become widely deployed to protect against potential threats. This time lag may be an interval of hours or days. Furthermore, even after a virus-scan defense has been devised, it can take organizations many days or longer to fully deploy virus-scan and software patch defenses against that attack, leaving a significant 'vulnerability gap' or window of time where user systems and networks are vulnerable to attack.

An embodiment of the present invention eliminates this window of vulnerability and improves network integrity. This is accomplished by enabling the network infrastructure to dynamically adapt to prevent network attacks on specific system vulnerabilities, as soon as those vulnerabilities have been identified. This is in contrast to the traditional technique of waiting for specific viruses to take advantage of a system vulnerability, discovering the viruses, analyzing them to determine their signatures, and employing signature-based scanning to detect and protect against the virus infection.

For example, specific software vulnerabilities may enable classes of viruses to attack specific logical ports in specific ways. An embodiment of the invention provides a solution for the problem posed by such vulnerabilities. The key benefit of the solution is its ability to protect against exploitation of the vulnerability, even before a specific virus or other attack is released.

Figure 1A:
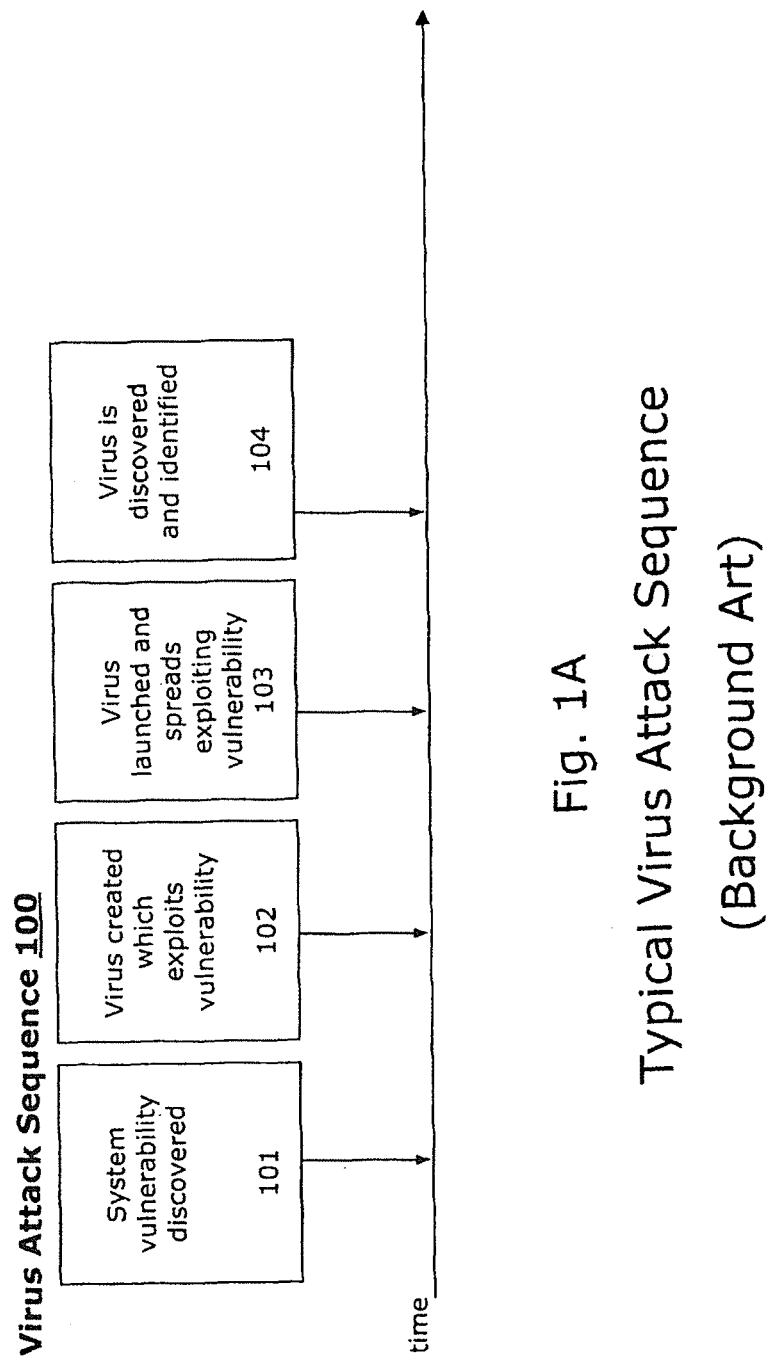
FIG. 1A is a timeline depicting a typical virus attack sequence.
Figure 1B:
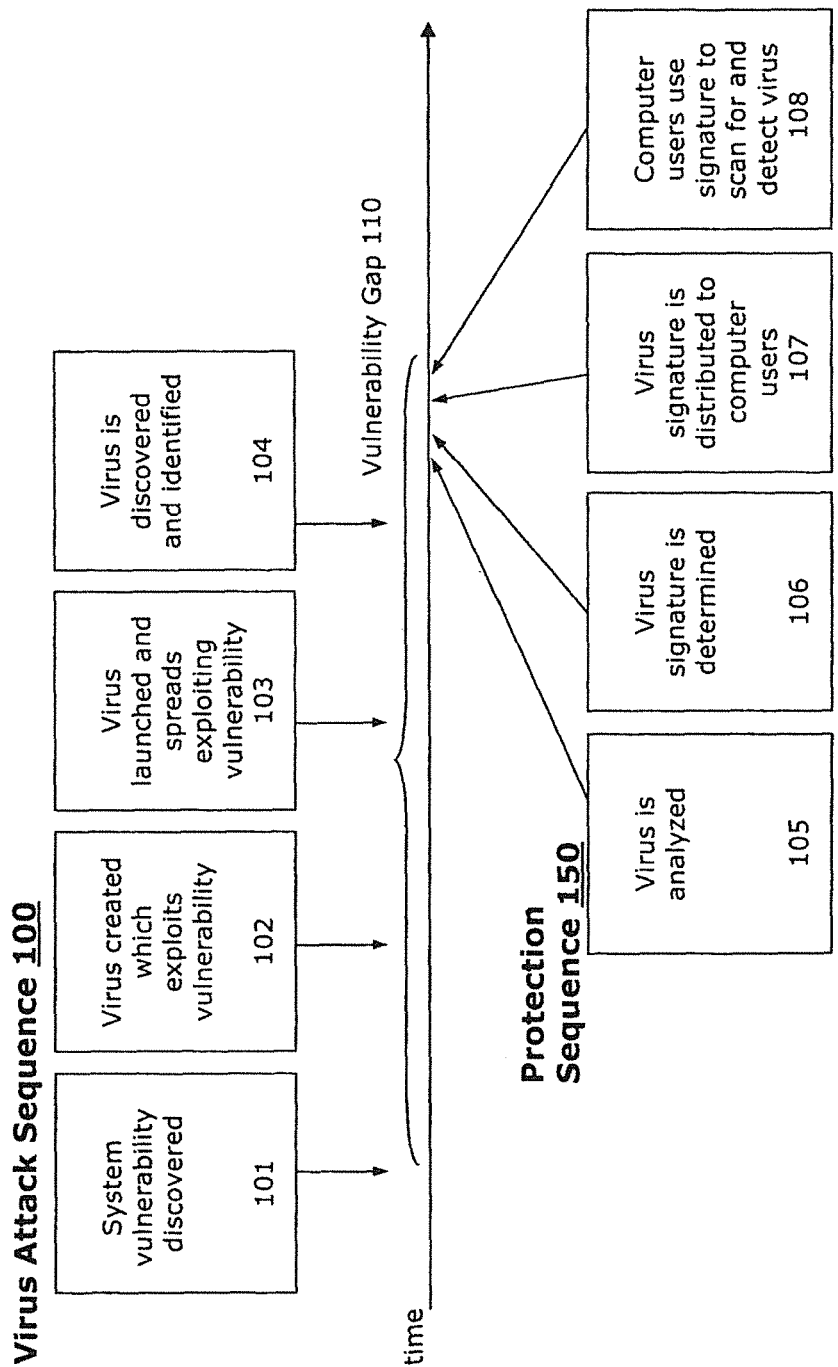
FIG. 1B. is a timeline depicting a traditional method for providing anti-virus security.
Figure 2:
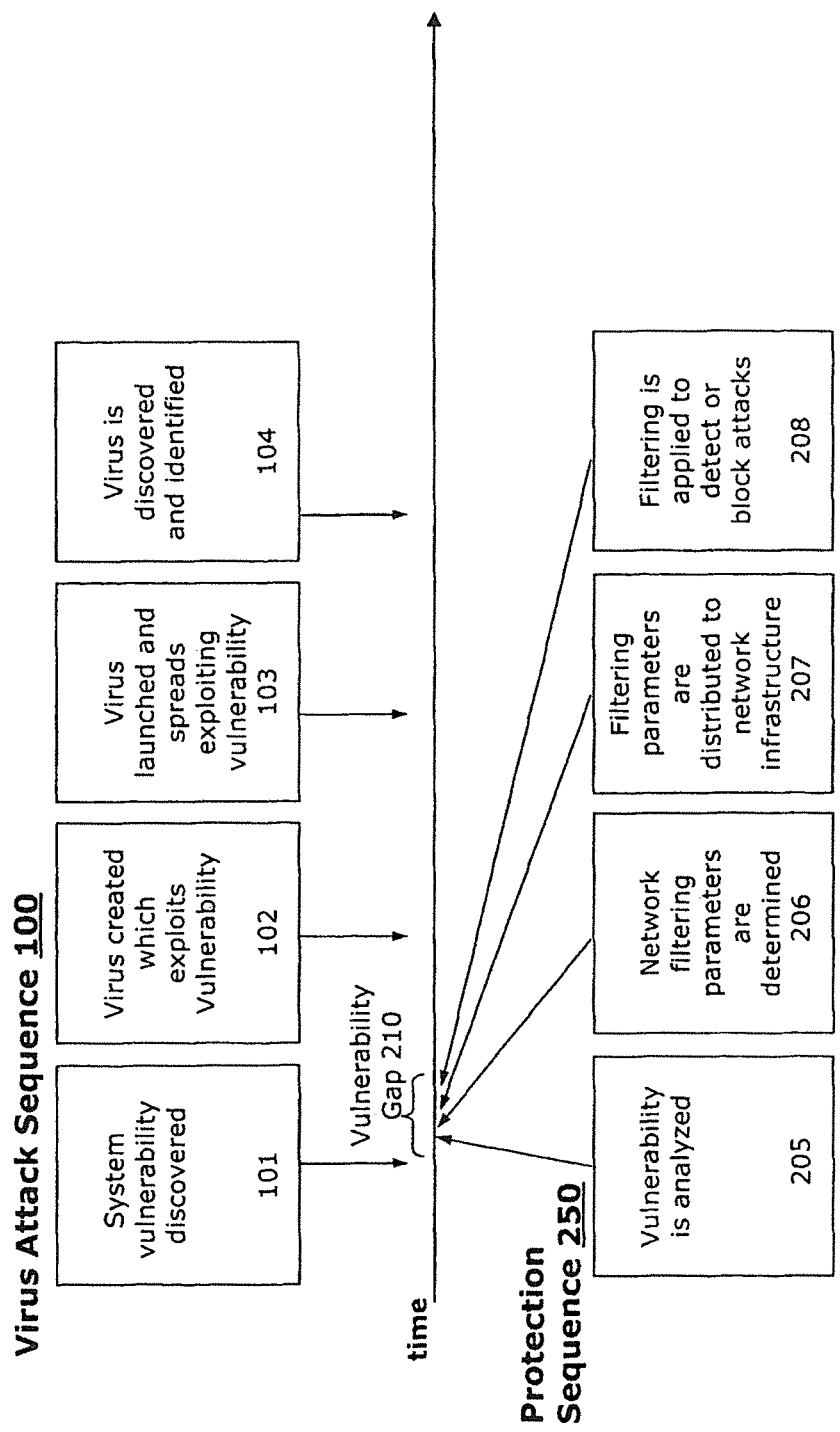
FIG. 2 is a timeline depicting a method for active containment of network security attacks in accordance with an embodiment of the invention.

FIG. 2 is a timeline depicting a protection sequence (250) for active containment of network security attacks in accordance with an embodiment of the invention. This sequence may begin as soon as a specific system vulnerability is discovered or identified (101). The specific vulnerability may relate to a specific known weakness of the system. The specific weakness may pertain to a weakness in a specific software component, such as an operating system, a utility (for example, a browser), or an application (for example, an instant messaging application).

Once the vulnerability has been discovered (101), the new protection sequence (250) may be initiated in accordance with an embodiment of the invention. In the new protection sequence (250), the vulnerability is first analyzed (205) to determine network behaviors that would trigger or exploit the vulnerability. The analysis may be performed with the assistance of software configurable to simulate and/or analyze a system. This initial analysis step (205) contrasts with the conventional technique's initial analysis step (105) which involves analyzing a specific virus (or worm or similar malicious code) after that virus has already been launched or unleashed. A benefit of this embodiment of the invention is that the analysis of the vulnerability may be performed much earlier, prior to the discovery or identification of any specific virus or other malicious code that exploits this vulnerability. This results in a smaller vulnerability gap (210).

In accordance with an embodiment of the invention, the vulnerability analysis determines filtering parameters (206) to be applied by packet filters at network infrastructure components. Network infrastructure components include, for example, LAN and/or WAN trunk lines, hubs, switches, routers, wireless access points, Intrusion Detection/Prevention System (IDS/IPS) and/or firewall appliances, and other hardware/software components. These parameters may then be distributed (207) to the appropriate network infrastructure components. At the network infrastructure components, filtering with the parameters may be applied (208) to detect an attack from unidentified viruses (or worms or other malicious code) that exploits the analyzed vulnerability. The networking infrastructure components may filter packets at a physical port, datalink (Ethernet MAC), network (IP), and/or session (TCP) level.

Once such an attack has been detected, action may be taken to contain or inhibit the attack. The action taken may include, for example, one or more of the following:

a. restricting any further packet transmission through a pertinent network port;

b. terminating the connection or session through a pertinent network port;

c. limiting the number of packets transmitted through a pertinent network port to some arbitrary level;

d. preventing or blocking specific types or sequences of packets from being transmitted through a pertinent network port, while permitting other packets to be transmitted without interruption; and e. triggering an alert to a human administrator, or higher-level network management system, for further action.

In an alternate embodiment, a known attack may be analyzed to find characteristic network behavior of that known attack and to determine network filtering parameters pertaining to that behavior. Those filtering parameters may be distributed to network infrastructure components, and filtering then applied using those parameters to detect attacks, followed by action to contain or inhibit any detected attack.

Figure 3:
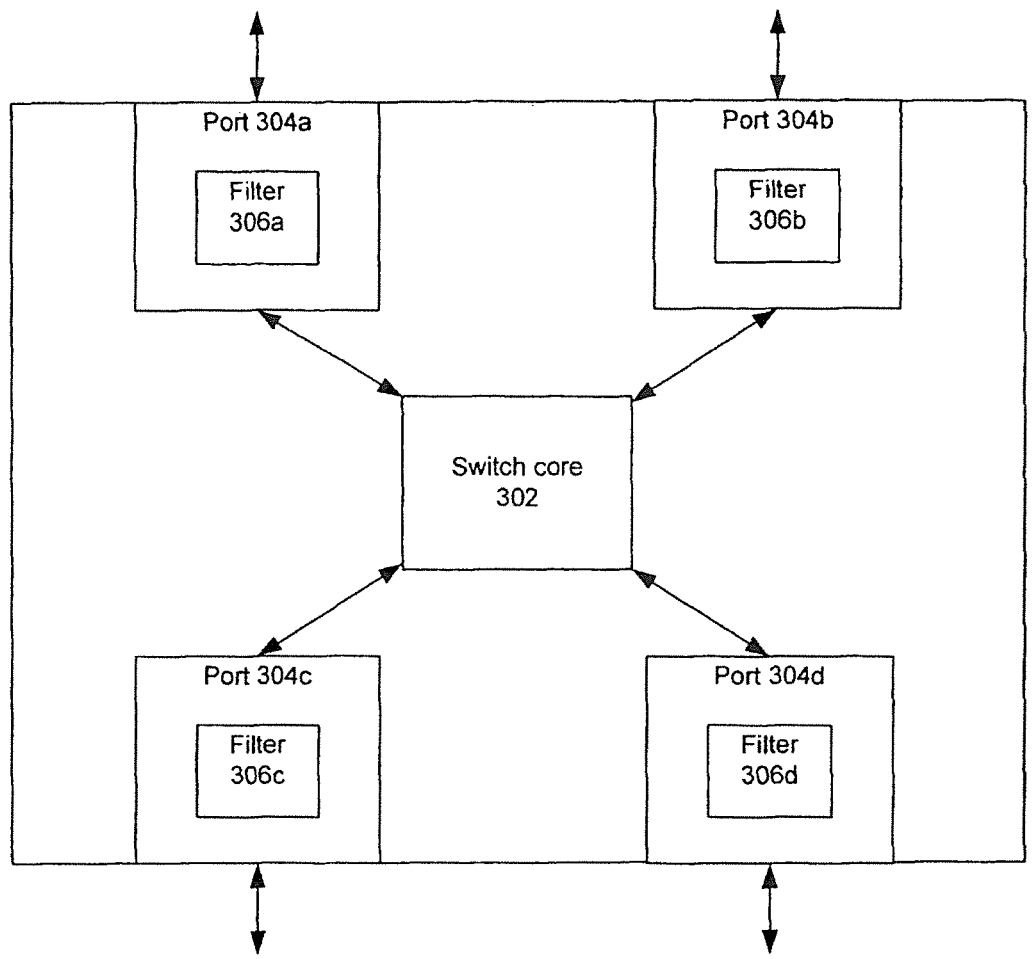
FIG. 3 is a schematic diagram depicting an example network infrastructure component configured for proactive containment of network security attacks in accordance with an embodiment of the invention.

FIG. 3 is a schematic diagram depicting an example network infrastructure component configured for proactive containment of network security attacks in accordance with an embodiment of the invention. In the example depicted in FIG. 3, the network component comprises a switch 300. Other examples of network infrastructure components include networking hubs, routers, wireless access points, IDS/IPS, firewalls, and network security appliances.

The example switch 300 shown in FIG. 3 includes a switching core 302 and various ports 304 communicatively coupled to the core. Each port 304 may in turn be communicatively coupled to a client system, or another network component. In the illustration of FIG. 3, four ports are shown by way of example. Of course, such a switch 300 may include more (or less) than four ports.

As shown in FIG. 3, each port 304 may effectively include a corresponding packet filter 306. These packet filters 306 are depicted schematically as being within the ports 304 for explanatory purposes, but they are more likely implemented as a firmware and/or hardware component (not illustrated) coupled to the switching core 302 and configured to filter packets going from one port to another port of the switch.

Using a network infrastructure component, such as the illustrated switch 300 of FIG. 3, packet filtering to detect and proactively contain viruses or other attacks may be employed at a port level at the network edge, with one client system per network port. Such a network infrastructure component may be configured to scan network packets directed to a specific client system or emanating from a particular client system. In some instances, the packets may be scanned to detect specific behaviors that would indicate an attack targeting a known system vulnerability. For example, Internet protocol (IP) packets containing network attacks targeting a specific IP port number, or specific sequences of packets directed to specific IP ports, may be detected and interrupted or blocked by the switch 300, or other network infrastructure component, so as to prevent the attack from being completed successfully.

In FIG. 3, the network ports are discussed above as physical ports. However, the technique may be applied also to logical ports in that a filter with modifiable parameters may be provided per logical port.

In one implementation, communications or packet streams from a specific client may be blocked entirely to prevent a virus or similar malicious infection from spreading from that client to other machines in a network, and/or communications or packet streams to a specific client may be blocked entirely to prevent a virus or similar malicious infection from spreading from another machine in the network to that client. Lower levels of containment would involve filtering of the packets to or from a specific client.

While the example embodiment discussed above in relation to FIG. 3 allows for proactive containment of viruses or attacks at the port level, it does require substantial processing bandwidth on the part of the network infrastructure components. Another example embodiment of the invention utilizes a dynamically-modifiable packet firewall and may be implemented so as to require less processing bandwidth. Such an embodiment is now described in relation to FIG. 4.

Figure 4:
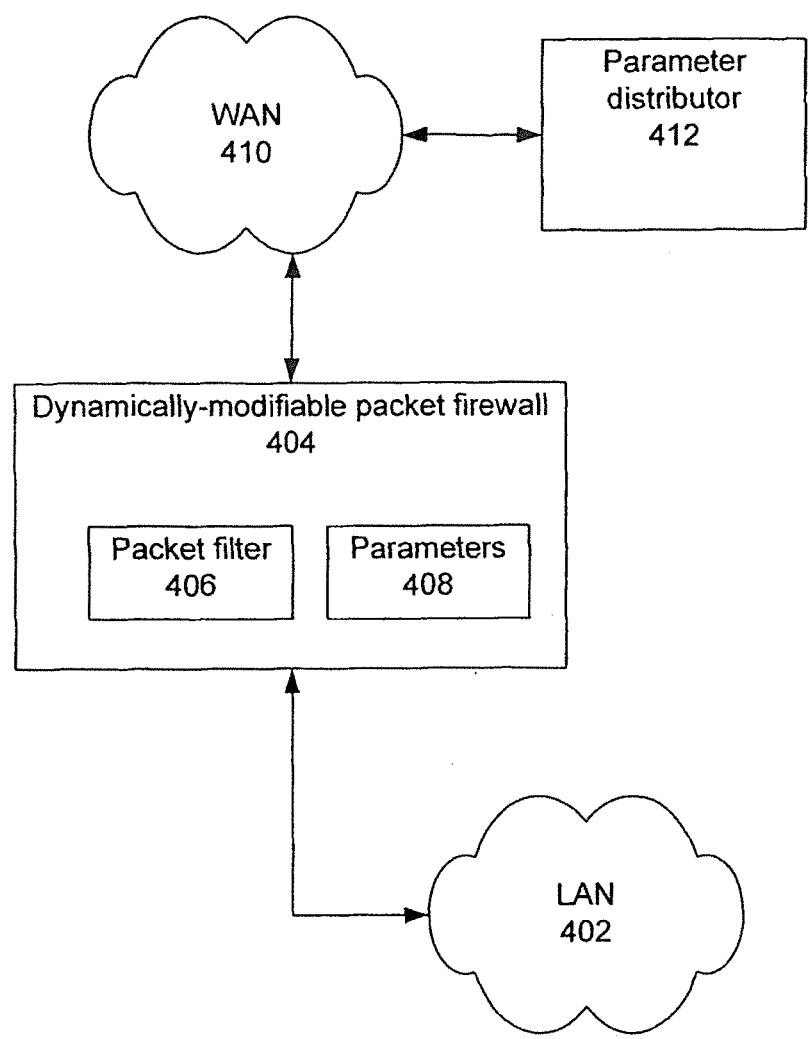
FIG. 4 is a schematic diagram depicting a dynamically-modifiable packet firewall configured for active containment of network security attacks in accordance with an embodiment of the invention.

FIG. 4 is a schematic diagram depicting a dynamically-modifiable packet firewall 404 configured for active containment of network security attacks in accordance with an embodiment of the invention. As depicted in FIG. 4, the firewall 404 may be configured, for example, to separate and protect a local area network (LAN) 402 from a wide area network 410. The firewall 404 may be implemented as part of a networking switch or other network infrastructure device. In one implementation, the firewall 404 may be configured to include a packet filter 406 and dynamically-modifiable parameters 408 to be applied by said filter 406 of the firewall 404. A parameter distributor 412 may be configured to distribute filter parameters to various such firewalls 404 in a network system.

The parameter distributor 412 may be, for example, at a network management station of an enterprise network, or at a remote service provider such as a web service. By way of such a parameter distributor 412, the appropriate filtering parameters to prevent exploitation of a vulnerability may be communicated over a network to a distributed set of network infrastructure components. In this way, the network may be proactively made very resistant against exploitation of the vulnerability. Using this technique, for example, an entire enterprise network may be proactively prepared against attacks exploiting a system vulnerability prior to the discovery of a specific virus targeting that vulnerability.

At any one time, there may be only a small number of specific vulnerabilities that have been recently discovered and for which newly-devised virus attacks may be expected to be launched. (Older known vulnerabilities may largely have been closed by available patches or broadly-deployed virus-scanning solutions.) By knowing up front the vulnerabilities against which attacks are most likely, the dynamically-modifiable packet firewall 404 may be configured to concentrate on filtering for those vulnerabilities so as to advantageously reduce the amount of processing required at the network infrastructure devices.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of proactive containment of network security attacks, the method comprising:
   identifying a specific system vulnerability;
   analyzing the specific system vulnerability to determine a network behavior that exploits the specific system vulnerability;
   determining, based upon the analysis, filtering parameters to be applied by packet filters at network infrastructure components; and
   distributing said filtering parameters to the network infrastructure components,
   wherein the network infrastructure components are to examine received packets using said filtering parameters to identify whether the packets include a predetermined sequence of packets that signal an occurrence of an attack against the specific system vulnerability, and
   wherein identifying the specific system vulnerability, analyzing the specific system vulnerability, determining the filtering parameters, and distributing the filtering parameters is performed prior to the identification by the network infrastructure components of a specific virus exploiting said vulnerability.

2. The method of claim 1, said method further comprising:
   taking action in the network infrastructure components to inhibit an identified attack, wherein the action to inhibit the identified attack comprises preventing the packets arranged in the predetermined sequence of packets from being transmitted through a network port, while permitting other packets to be transmitted without interruption, and wherein the action to inhibit the attack further comprises restricting further packet transmission through the network port.

3. The method of claim 1, further comprising:
   taking action in the network infrastructure components to inhibit an identified attack, wherein the action to inhibit the identified attack further comprises terminating a connection or session through a network port of the network infrastructure components.

4. The method of claim 1, further comprising:
   taking action in the network infrastructure components to inhibit an identified attack, wherein the action to inhibit the identified attack further comprises limiting a number of packets transmitted through a network port of the network infrastructure components.

5. The method of claim 1, further comprising:
   taking action in the network infrastructure components to inhibit an identified attack, wherein the action to inhibit the identified attack further comprises preventing specific types of packets from being transmitted through a network port of the network infrastructure components, while permitting other types of packets to be transmitted without interruption.

6. The method of claim 1, further comprising:
taking action in the network infrastructure components to inhibit an identified attack, wherein the action to inhibit the identified attack further comprises triggering an alert to a network management system.

7. The method of claim 1, wherein the specific system vulnerability pertains to a specific software component.

8. The method of claim 7, wherein the specific software component comprises an operating system, or a utility, or an application.

9. The method of claim 1, wherein the network infrastructure components comprise at least one component selected from a group of components consisting of networking hubs, switches, routers, wireless access points, IDS/IPS, firewall, and network security appliances.

10. The method of claim 1, wherein the networking infrastructure components filter packets at a physical port, datalink, network, and/or session level.

11. The method of claim 1, further comprising filtering packets by the networking infrastructure components using hardware circuitry and firmware of the networking infrastructure components.

12. The method of claim 1, wherein the network infrastructure components comprise dynamically-modifiable packet firewalls.

13. The method of claim 1, further comprising identifying the specific system vulnerability prior to the identification by the network infrastructure components of a specific virus exploiting said vulnerability.

14. The method of claim 1, wherein distributing said parameters further comprises distributing said filtering parameters by a network management system of an enterprise network.

15. The method of claim 1, wherein distributing said filtering parameters further comprises distributing said filtering parameters by a remote service provider.

16. The method of claim 15, wherein the remote service provider comprises a web-based service.

17. A system of proactive containment of network security attacks, the system comprising:
a processor; and
a storage device on which is stored machine-readable instructions to cause the processor to:
identify a specific system vulnerability;
analyze the specific system vulnerability to determine a network behavior that exploits the specific system vulnerability;
determine, based upon the analysis of the specific system vulnerability, network filtering parameters corresponding to a specific system vulnerability; and
distribute said parameters to network infrastructure components, wherein the network infrastructure components are to:
examine received packets using said filtering parameters to identify whether the received packets include a predetermined sequence of packets that signal an occurrence of an attack against the specific system vulnerability; and
take action to inhibit the detected attack, the action being to prevent the received packets arranged in the predetermined sequences of packets from being transmitted through a network port, while permitting other received packets to be transmitted without interruption, wherein identifying the specific system vulnerability, analyzing the specific system vulnerability, determining the filtering parameters, and distributing the filtering parameters is performed prior to the identification by the network infrastructure components of a specific virus exploiting said vulnerability.

18. A network infrastructure component to proactively contain network security attacks, the network infrastructure component comprising:
a processor; and
a storage device on which is stored machine-readable instructions to cause the processor to:
prior to identification of a specific virus exploiting a specific system vulnerability, receive and store network filtering parameters corresponding to the specific system vulnerability, wherein the network filtering parameters are determined based upon an identification of the specific system vulnerability and an analysis of the specific system vulnerability to determine a network behavior that exploits these specific system vulnerability;
examine received packets using said network filtering parameters to detect whether the received packets include a predetermined sequence of packets that signal an occurrence of an attack against the specific system vulnerability; and
prevent the received packets arranged in the predetermined sequence of packets from being transmitted through a network port, while permitting other packets to be transmitted without interruption, wherein the network filtering parameters are distributed to the network infrastructure component prior to the discovery of a specific virus exploiting said vulnerability.

19. The network infrastructure component of claim 18, wherein the network infrastructure component comprises a device selected from a group of devices consisting of networking hubs, switches, routers, wireless access points, IDS/IPS, firewall, and network security appliances.

20. The network infrastructure component of claim 18, wherein the networking infrastructure component filters packets at a physical port, datalink (MAC address), network (IP), and/or session (TCP) level.

21. The network infrastructure component of claim 18, wherein the network infrastructure component comprises a dynamically-modifiable packet firewall.

22. The network infrastructure component of claim 18, wherein said parameters are distributed by a network management system of an enterprise network.

23. The network infrastructure component of claim 18, wherein said parameters are distributed by a remote service provider.

* * * * *